(12) United States Patent
Chen et al.

(10) Patent No.: US 11,308,038 B2
(45) Date of Patent: Apr. 19, 2022

(54) COPYING CONTAINER IMAGES

(71) Applicant: Red Hat, Inc., Raleigh, NC (US)

(72) Inventors: Huamin Chen, Westboro, MA (US); Dennis Keefe, Smithfield, RI (US)

(73) Assignee: Red Hat, Inc., Raleigh, NC (US)

( * ) Notice: Subject to any disclaimer, the term of this patent is extended or adjusted under 35 U.S.C. 154(b) by 324 days.

(21) Appl. No.: 16/016,113

(22) Filed: Jun. 22, 2018

(65) Prior Publication Data

US 2019/0392052 A1 Dec. 26, 2019

(51) Int. Cl.
*G06F 16/178* (2019.01)
*G06F 16/13* (2019.01)

(52) U.S. Cl.
CPC .......... *G06F 16/178* (2019.01); *G06F 16/137* (2019.01)

(58) Field of Classification Search
CPC .... G06F 3/0626; G06F 3/0667; G06F 16/137; G06F 16/1752; G06F 16/188; G06F 16/2282; G06F 2201/815
USPC ................. 707/698, 814, E17.036, E17.052, 707/E17.004, E17.019, E17.02, E17.023, 707/812, 822
See application file for complete search history.

(56) References Cited

U.S. PATENT DOCUMENTS

| | | | | |
|---|---|---|---|---|
| 5,893,095 | A * | 4/1999 | Jain | G06F 16/5838 |
| 7,685,083 | B2 * | 3/2010 | Fairweather | G06K 13/0825 706/45 |
| 7,734,595 | B2 * | 6/2010 | Margolus | G06F 16/2358 707/662 |
| 8,326,839 | B2 * | 12/2012 | Idicula | G06F 16/835 707/747 |
| 9,298,723 | B1 * | 3/2016 | Vincent | G06F 16/172 |
| 9,384,207 | B2 | 7/2016 | Provenzano et al. | |
| 9,471,590 | B2 | 10/2016 | Venkatesh et al. | |
| 9,612,749 | B2 | 4/2017 | Wang | |
| 9,639,558 | B2 | 5/2017 | Alton | |
| 9,639,591 | B2 | 5/2017 | Segev et al. | |
| 9,928,210 | B1 * | 3/2018 | Zhang | G06F 15/8084 |
| 10,216,757 | B1 * | 2/2019 | Armangau | G06F 16/125 |
| 10,235,222 | B2 * | 3/2019 | Jobi | G06F 9/545 |
| 10,417,184 | B1 * | 9/2019 | Long | G06F 16/166 |
| 10,592,347 | B2 * | 3/2020 | Todd | G06F 16/137 |
| 10,649,861 | B1 * | 5/2020 | Natanzon | G06F 11/302 |
| 10,684,790 | B2 * | 6/2020 | Natanzon | G06F 11/1446 |

(Continued)

OTHER PUBLICATIONS

"Perform Rolling Update Using a Replication Controller," 2018, https://kubernetes.io/doos/tasks/run-application/rolling-update-replication-controller/.

(Continued)

*Primary Examiner* — Alex Gofman
*Assistant Examiner* — Linh Black
(74) *Attorney, Agent, or Firm* — Kilpatrick Townsend & Stockton LLP (57) ABSTRACT

Container images can be copied. For example, a computing device can segment a container image into at least two data chunks. The computing device can determine a reference count for a data chunk among the at least two data chunks. The computing device can determine that the reference count for the data chunk is below a threshold value. In response to determining that the reference count for the data chunk is below the threshold value, the computing device can prevent a destination device from being queried about the data chunk prior to transmitting the data chunk to the destination device.

17 Claims, 3 Drawing Sheets

(56) References Cited

U.S. PATENT DOCUMENTS

| | | | | |
|---|---|---|---|---|
| 10,812,582 B2* | 10/2020 | Spillane | ............ | G06F 9/45558 |
| 2002/0165727 A1* | 11/2002 | Greene | ............... | H04L 63/102 |
| | | | | 705/1.1 |
| 2012/0159098 A1* | 6/2012 | Cheung | ............ | G06F 12/0261 |
| | | | | 711/162 |
| 2013/0054545 A1* | 2/2013 | Anglin | ............... | G06F 3/0673 |
| | | | | 707/693 |
| 2014/0052706 A1* | 2/2014 | Misra | .................. | G06F 3/0613 |
| | | | | 707/698 |
| 2017/0070302 A1* | 3/2017 | Tuscano | ................. | H04L 47/50 |
| 2017/0091232 A1* | 3/2017 | Ghanbari | ........... | G06F 16/1748 |
| 2017/0177877 A1* | 6/2017 | Suarez | ................ | G06F 16/188 |
| 2017/0264684 A1* | 9/2017 | Spillane | ............ | H04L 67/1095 |
| 2018/0018235 A1* | 1/2018 | Arslan | ................ | H03M 13/356 |
| 2018/0091466 A1* | 3/2018 | Friedman | ............... | H04L 51/30 |
| 2018/0189176 A1* | 7/2018 | Jobi | ..................... | G06F 16/162 |

OTHER PUBLICATIONS

Kubala, N., "Introducing Container-Diff, a Tool for Quickly Comparing Container Images," Google, Nov. 16, 2017, https://opensource.googleblog.com/2017/11/container-diff-for-comparing-container-images.html.

Marsh et al., "Best practices for Azure Container Registry," Microsoft, Dec. 20, 2017, https://docs.microsoft.com/en-us/azure/container-registry/container-registry-best-practices.

* cited by examiner

FIG. 3

COPYING CONTAINER IMAGES

TECHNICAL FIELD

The present disclosure relates generally to file management and replication. More specifically, but not by way of limitation, this disclosure relates to copying container images.

BACKGROUND

Computers use operating systems to manage system processes and resources. Some operating systems, such as the Linux operating system, include a low-level software component for managing system processes and resources. The low-level software component is called a "kernel." The kernel can provide features, such as namespaces and cgroups, for isolating processes and resources from one another. These features can be used to segregate processes and resources (e.g., memory, CPU processing power, and network resources) into relatively isolated virtual-environments called "containers." Containers can be deployed from image files, which can be referred to as container images.

Container images are often stored in an image repository maintained by a server. Devices can communicate with the server to request copies (e.g., "replicas") of the container images. Traditionally, the server will copy a container image to a destination device by first segmenting the container image into data chunks. A data chunk can be a segment or block of data. The server can then separately query the destination device about each data chunk to determine whether destination device already has the data chunk, and only transmit the data chunks that are absent from the destination device. This can prevent duplicates of data chunks from being copied to the destination device.

DETAILED DESCRIPTION

There can be disadvantages to the traditional approach for copying a container image to a destination device. For example, the traditional approach can involve a server segmenting the container image into a large number (e.g., tens of thousands) of data chunks and individually querying the destination device about each data chunk to determine whether the data chunk is already present at the destination device. But each individual query takes time and bandwidth to complete. As a result, the traditional approach can introduce significant latency into the system and consume valuable bandwidth.

Some examples of the present disclosure can overcome one or more of the abovementioned problems by determining a likelihood that a destination device already has a data chunk (e.g., a data segment) and only querying the destination device about the data chunk if the destination device likely has the data chunk. For example, the server can determine a likelihood that the destination device already has a particular data chunk. If the destination device probably has the data chunk, the server can query the destination device to confirm that it has the data chunk. If the destination device probably does not have the data chunk, the server can transmit the data chunk to the destination device, without first querying the destination device. This process can be applied to some or all of the data chunks in a container image, which may result in many of the data chunks being copied to the destination device without first querying the destination device. This can avoid a significant number of queries typically required by the traditional approach, which can reduce latency and bandwidth consumption.

As a specific example, a server can receive a request for a container image in an image repository from a destination device. In response to the request, the server can segment the container image into data chunks. The server can then determine the number of times that each of the data chunks is also present in the other container images in the image repository. The number of times that a particular data chunk is present in the other container images can be referred to as a reference count. The reference count can indicate the likelihood that the destination device already has the particular data chunk. A higher reference count may indicate a higher likelihood (e.g., probability) that the destination device already has the particular data chunk, and a lower reference count may indicate a lower likelihood that the destination device already has the particular data chunk.

Some data chunks can have significantly higher reference counts than other data chunks. For example, a particular data chunk may be part of an operating-system layer of a container image. The operating-system layer can include files and libraries for implementing a particular operating system, such as the Red Hat™ Linux operating system. Because many other container images may also have the same operating-system layer for implementing the same operating system, the particular data chunk may also be present in many other container images. This can result in the particular data chunk having a relatively high reference count.

After determining the reference counts for the data chunks in a container image, the server can compare each reference count to a threshold value. One example of the threshold value is 500. If a reference count for a data chunk is above the threshold value, the server can query the destination device to check whether the destination device already has the data chunk. If the destination device does not already have the data chunk, the server can transmit the data chunk to the destination device. If the destination device already has the data chunk, the server can prevent the data chunk from being transmitted to the destination device. This can avoid unnecessary data-chunk duplication and bandwidth consumption. If a reference count for a data chunk is below the threshold value, the server can transmit the data chunk to the destination device, without first querying the destination device. This can avoid unnecessarily querying the destination device in circumstances when the likely result of the query would be negative, thereby reducing latency and improving bandwidth.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
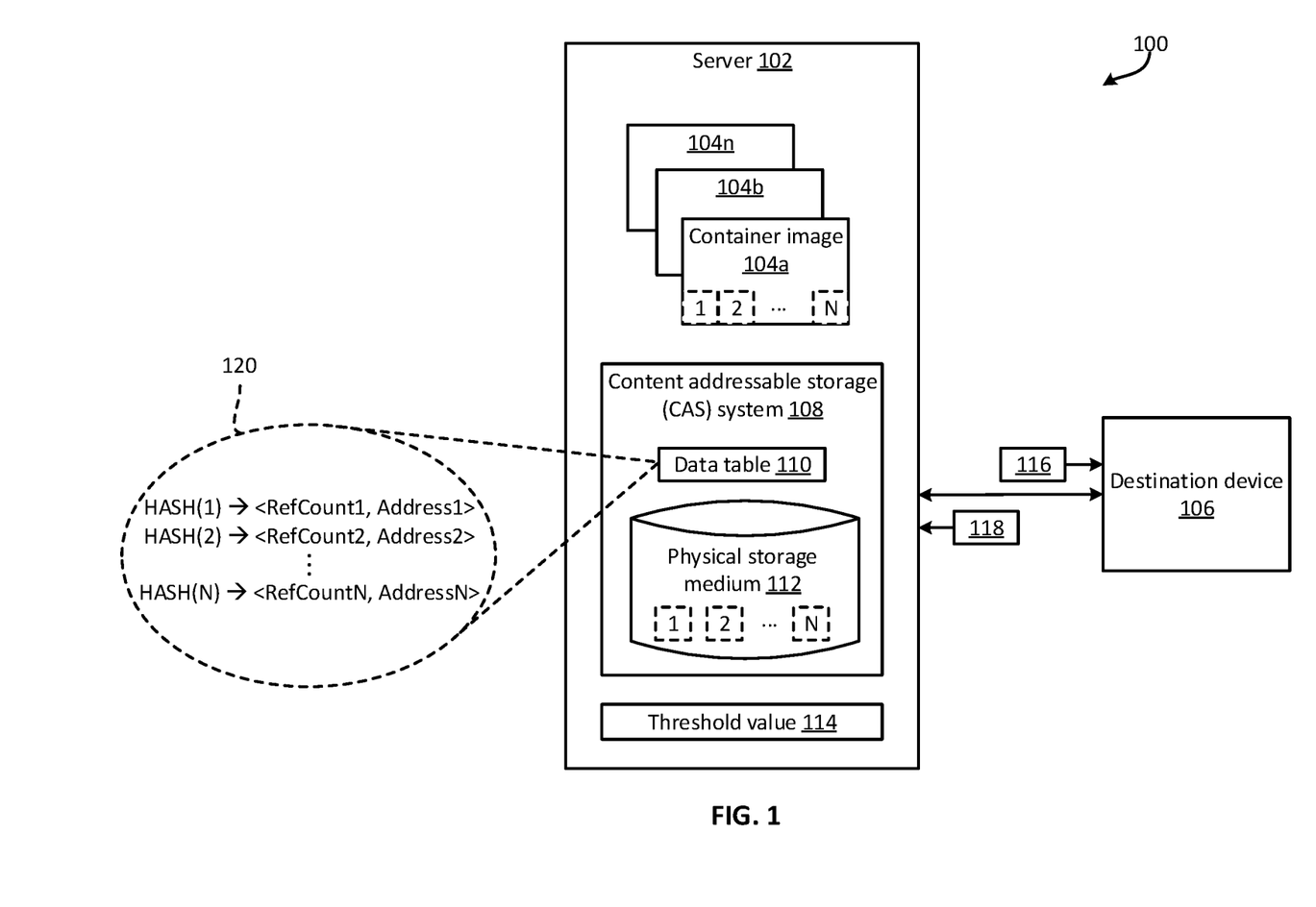
FIG. 1 is a block diagram of an example of a system for copying container images according to some aspects.

FIG. 1 is a block diagram of an example of a system 100 for copying container images 104*a-n* according to some aspects. The system 100 includes a server 102 which, in some examples, can be a node in a distributed (e.g., cloud)

computing environment. The server 102 can manage an image repository that includes the container images 104*a-n*.

In some examples, the server 102 uses a content addressable storage (CAS) system 108 to manage the container images 104*a-n*. The CAS system 108 can store data chunks of the container images 104*a-n* such that the data chunks can be searched and retrieved based on their content (e.g., rather than their storage locations). To implement this functionality, the CAS system 108 can include a physical storage medium 112 and a data table 110. An example of the physical storage medium 112 can include a hard disk. The physical storage medium 112 can physically store the data chunks for the container images 104*a-n*. For example, as shown in FIG. 1, the physical storage medium 112 can include data chunks 1-N of container image 104*a*. The data table 110 can maintain relationships between (i) hashed versions of the data chunks stored in the physical storage medium 112, (ii) reference counts for the data chunks, and (iii) logical addresses indicating locations on the physical storage medium 112 at which the data chunks are stored. The hashed versions of the data chunks can serve as keys that can be searched by the CAS system 108.

In one example, the server 102 can receive a container image 104*a* and segment the container image 104*a* into N data chunks of a particular size, such as 8 bits. The server 102 can then determine hashed versions of the data chunks, and search the data table 110 for the presence of each of the hashed versions of the data chunks. As a particular example, if data chunk N has the value "ABC," the server 102 can determine that the hashed version of the data chunk is HASH(ABC)="23FG345A." The server 102 can then search the data table 110 for "23FG345A." If the server 102 does not find a hashed version of a data chunk in the data table 110, the server 102 can store the data chunk in the physical storage medium 112. The server 102 can also add a row to the data table 110 that includes (i) the hashed version of the data chunk, (ii) a reference count of 1, and (iii) a logical address indicating the location on the physical storage medium 112 at which the data chunk is stored. If the server 102 finds a hashed version of a data chunk in the data table 110, the server 102 can increment the reference count for the data chunk by one, without again storing the data chunk in the physical storage medium 112. This can prevent duplicates of the same data-chunk from being stored in the physical storage medium 112.

One example of the content of the data table 110 is shown in dashed circle 120. HASH(1) can represent the hashed version of data chunk 1 in container image 104*a*, RefCount1 can represent the reference count for data chunk 1, and Address1 can represent the logical address for data chunk 1. An example of RefCount1 can be 27 (e.g., if data chunk 1 is in 27 container images in the image repository). HASH(2) can represent the hashed version of data chunk 2 in container image 104*a*, RefCount2 can represent the reference count for data chunk 2, and Address2 can represent the logical address for data chunk 2. HASH(N) can represent the hashed version of data chunk N in container image 104*a*, RefCountN can represent the reference count for data chunk N, and AddressN can represent the logical address for data chunk N.

In some examples, the server 102 can update the data table 110 using the above process each time the server 102 receives a new container image. The server 102 can also update the data table 110 each time a container image is removed from the repository. For example, if a container image is to be removed from the repository, the server 102 can determine which of the data chunks in the data table 110 belong to the container image and decrement the reference count for each of the data chunks by one. If decrementing a reference count for a data chunk would result in a value of zero, the server 102 can remove the data chunk's row from the data table 110 and delete the data chunk from the physical storage medium 112. Updating the data table 110 as discussed above can enable the server 102 to maintain an update-to-date log of reference counts for data chunks.

At some point, the server 102 may receive a request for a container image 104*a* from a destination device 106, such as another server or a client device. In response, the server 102 can segment the container image 104*a* into data chunks and search for each data chunk in the data table 110 to determine a reference count corresponding to the data chunk. The reference count can indicate how many times the data chunk is present in the group of container images 104*a-n* (or a subset thereof). After determining a reference count for a data chunk, the server 102 can determine whether the reference count is above or below a threshold value 114. In some examples, if the reference count is above the threshold value 114, it may indicate that the destination device 106 likely already has the data chunk. So, the server 102 can transmit a query communication 116 to the destination device 106 and await a response 118. If the response 118 indicates that the destination device 106 already has the data chunk, the server 102 can prevent the data chunk from being transmitted to the destination device 106. If the response 118 indicates that the destination device 106 does not already have the data chunk, the server 102 can transmit the data chunk to the destination device 106. In some examples, if the reference count for the data chunk is below the threshold value 114, it may indicate that the destination device 106 likely does not have the data chunk. So, the server 102 can transmit the data chunk to the destination device 106, without first transmitting a query communication 116 to the destination device 106.

In some examples, the threshold value 114 can be determined based on a system constraint, a data-chunk size, or both. Examples of system constraints can include a latency constraint, such as a maximum amount of latency allowed by the system 100; a memory constraint, such as a maximum amount of memory that the server 102 can devote to copying a container image 104*a* to a destination device 106; a processing constraint, such as a maximum amount of processing power that the server 102 can devote to copying a container image 104*a* to a destination device 106; or any combination of these. The system constraint may be input by a user or automatically determined by the server 102 after analyzing one or more aspects of the system 100.

As a specific example, server 102 can tailor the threshold value 114 so as to respect a latency requirement of the system 100. In one such example, the system 100 can have a relatively high tolerance for latency, the data chunks can be relatively large in size, or both. So, the server 102 can set the threshold value 114 to a lower value in order to enable more query communications 116 to be sent to the destination device 106. This can reduce the number of data chunks that are sent to the destination device 106. In another example, the system 100 can have a relatively low tolerance for latency, the data chunks can be relatively small in size, or both. So, the server 102 can set the threshold value 114 to a higher value to reduce the number of query communications 116 sent to the destination device 106. This can also increase the number of data chunks that are sent to the destination device 106. The server 102 can balance the size of the data chunks with one or more system constraints to determine an appropriate threshold value 114.

The example shown in FIG. 1 is intended to be illustrative, and other examples can include more components, fewer components, different components, or a different arrangement of the components than shown in FIG. 1. For instance, although the server 102 includes the CAS system 108 in FIG. 1, in other examples the server 102 can be separate from and communicatively coupled to at least a portion of the CAS system 108. Likewise, although the server 102 includes the container images 104a-n in FIG. 1, in other examples the container images 104-an can be stored in a database that is separate from and accessible to the server 102 (e.g., via a network).

Figure 2:
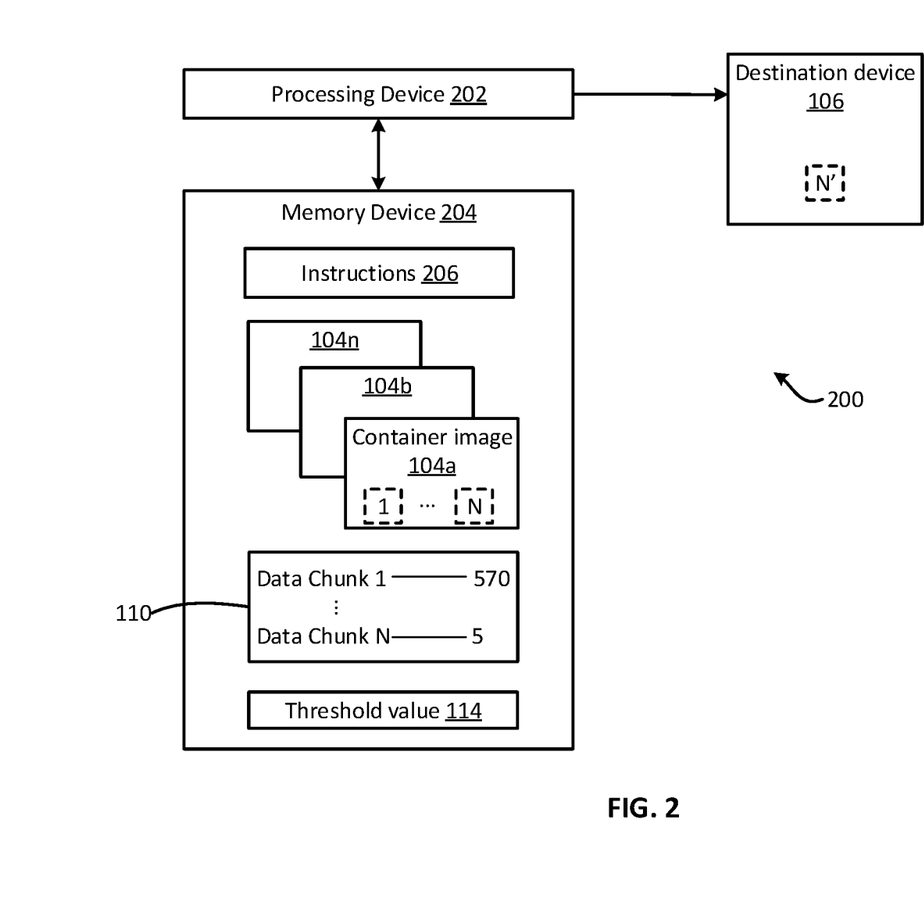
FIG. 2 is a block diagram of another example of a system for copying container images according to some aspects.

FIG. 2 is a block diagram of another example of a system 200 for copying container images 104a-n according to some aspects. The system 200 includes a processing device 202 communicatively coupled with a memory device 204. The processing device 202 can include one processing device or multiple processing devices. Non-limiting examples of the processing device 202 include a Field-Programmable Gate Array (FPGA), an application-specific integrated circuit (ASIC), a microprocessor, etc. The processing device 202 can execute instructions 206 stored in the memory device 204 to perform operations. In some examples, the instructions 206 can include processor-specific instructions generated by a compiler or an interpreter from code written in any suitable computer-programming language, such as C, C++, C#, etc.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EE-PROM), flash memory, or any other type of non-volatile memory. In some examples, at least some of the memory device can include a medium from which the processing device 202 can read instructions 206. A computer-readable medium can include electronic, optical, magnetic, or other storage devices capable of providing the processing device 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

The memory device 204 can also include any number and combination of container images 104a-n and a data table 110, which can indicate reference counts for some or all of the data chunks that form some or all of the container images 104a-n.

In some examples, the processing device 202 can receive a request for a container image 104a from a destination device 106. In response, the processing device 202 can segment the container image 104a into at least two data chunks, such as data chunk 1 and data chunk N shown in FIG. 2. The processing device 202 can then determine a respective reference count for each of the data chunks. In some examples, the processing device 202 can determine a reference count for a data chunk using the data table 110. For example, the processing device 202 can consult the data table 110 to determine that the reference count for data chunk 1 is 570. The processing device can also consult the data table 110 to determine that the reference count for data chunk N is five. In other examples, the processing device 202 can determine a reference count for a data chunk "on the fly." For example, the processing device 202 can segment the other container images 104b-n into their respective data chunks and count the number of times that data chunk 1 is present in the data chunks of the other container images 104b-n. The processing device 202 can also count the number of times that data chunk N is present in the data chunks of the other container images 104b-n.

After determining a reference count for a data chunk, the processing device 202 can determine whether the reference count is above or below the threshold value 114. For example, the processing device 202 can compare the reference count for data chunk 1 to the threshold value 114 to determine that the reference count for data chunk 1 is above the threshold value 114 (e.g., 100). So, the processing device 202 can query the destination device 106 about whether the destination device 106 already has data chunk 1. If the destination device 106 already has data chunk 1, the processing device 202 can simply move on to assessing the next data chunk, without transmitting data chunk 1 to the destination device 106. If the destination device 106 does not already have data chunk 1, the processing device 202 can transmit data chunk 1 to the destination device 106. As another example, the processing device 202 can compare the reference count for data chunk N to the threshold value 114 to determine that the reference count for data chunk N is below the threshold value 114 (e.g., 100). So, the processing device 202 can transmit data chunk N to the destination device 106, as represented by data chunk N' shown in FIG. 2. The processing device 202 can transmit data chunk N to the destination device 106, without first querying the destination device 106 about whether the destination device 106 already has data chunk N.

The processing device 202 can repeat the above process for some or all of the data chunks in the container image 104a. At the end of this process, the destination device 106 can have a copy of the container image 104a generated using fewer queries than would be traditionally required.

Figure 3:
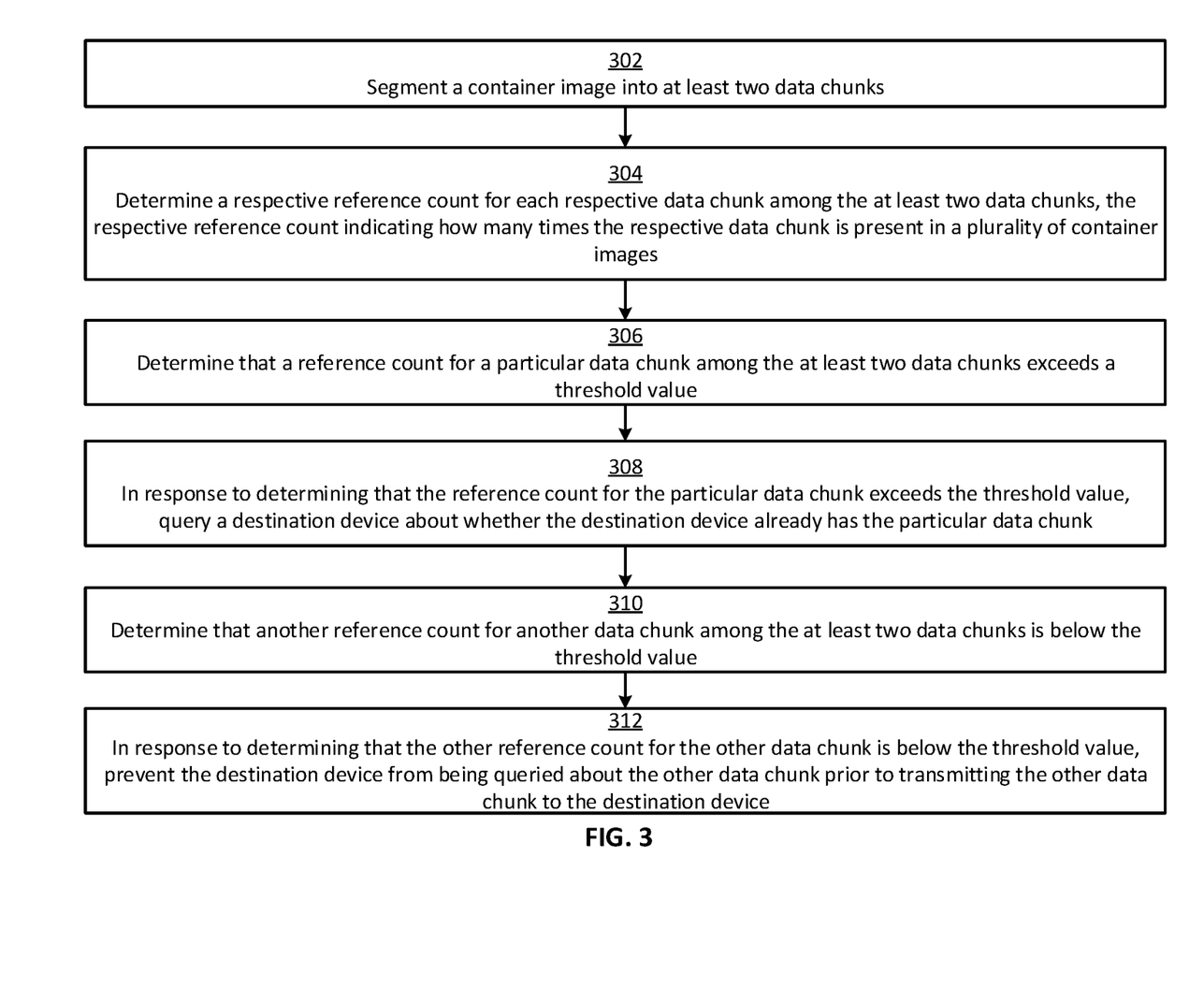
FIG. 3 is a flow chart of an example of a process for copying container images according to some aspects.

In some examples, the processing device 202 can implement some or all of the steps shown in FIG. 3. Other examples can include more steps, fewer steps, different steps, or a different combination of steps than are shown in FIG. 3. The steps of FIG. 3 are discussed below with reference to the components discussed above in relation to FIG. 2.

In block 302, a processing device 202 segments a container image 104a into at least two data chunks. The processing device 202 can segment the container image 104a into data chunks of a predefined size. For example, the container image 104 can be 6 gigabytes (GB) in size. So, the processing device 202 can split the container image 104 into 6,000 data chunks that are 1 megabyte (MB) in size.

In block 304, the processing device 202 determines a respective reference count for each respective data chunk among the at least two data chunks. The respective reference count can indicate how many times the respective data chunk is present in a group of container images 104a-n.

In some examples, the processing device 202 can determine a reference count for a data chunk by accessing a data table 110 that includes relationships between data chunks and reference counts. In other examples, the processing device 202 can determine a reference count for a data chunk by first segmenting the group of container images 104b-n into a group of data chunks. The processing device 202 can then count the number of times that the data chunk is present in the group of data chunks. The processing device 202 can use any number and combination of techniques to determine a reference count for a data chunk.

In block 306, the processing device 202 determines that a reference count for a particular data chunk (e.g., data chunk 1) among the at least two data chunks exceeds a threshold value 114.

In block 308, the processing device 202 queries a destination device 106 about whether the destination device 106 already has the particular data chunk. The processing device 202 can query the destination device 106 in response to determining that the reference count for the particular data chunk exceeds the threshold value 114. Querying the destination device 106 can involve transmitting a query communication to the destination device 106.

In block 310, the processing device 202 determines that another reference count for another data chunk (e.g., data chunk N) among the at least two data chunks is below the threshold value 114.

In block 312, the processing device 202 prevents the destination device 106 from being queried about the other data chunk (e.g., about whether the destination device 106 already has the other data chunk) prior to transmitting the other data chunk to the destination device 106. The processing device 202 can prevent the destination device 106 from being queried in response to determining that the other reference count for the other data chunk is below the threshold value 114.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s).

The invention claimed is:

1. A system comprising:
a processing device; and
a memory device including instructions that are executable by the processing device for causing the processing device to:
for each respective data chunk of at least two data chunks in a container image:
determine a respective reference count for the respective data chunk;
hash the respective data chunk to generate a hashed key;
determine a logical address for the respective data chunk on a physical storage medium of a content addressable storage (CAS) system; and
store the hashed key, the respective reference count, and the logical address for the respective data chunk in a data table of the CAS system;
receive a request for the container image from a client device; and
in response to receiving the request:
determine that the container image includes the at least two data chunks;
determine a reference count for a data chunk among the at least two data chunks by accessing the data table, the reference count indicating how many times the data chunk is present in a plurality of container images;
determine that the reference count for the data chunk is below a threshold value; and
in response to determining that the reference count for the data chunk is below the threshold value, prevent the client device from being queried about the data chunk prior to transmitting the data chunk to the client device.

2. The system of claim 1, wherein the memory device further includes instructions that are executable by the processing device for causing the processing device to:
determine another reference count for another data chunk among the at least two data chunks by accessing the data table;
determine that the other reference count for the other data chunk exceeds the threshold value;
in response to determining that the other reference count for the other data chunk exceeds the threshold value:
transmit a query communication to the client device;
receive a response to the query communication from the client device; and
transmit the other data chunk to the client device based on the response indicating that the other data chunk does not already exist on the client device; or
prevent the other data chunk from being transmitted to the client device based on the response indicating that the other data chunk already exists on the client device.

3. The system of claim 1, wherein the at least two data chunks each have a predefined size, and the memory device further includes instructions that are executable by the processing device for causing the processing device to:
segment the plurality of container images into a plurality of data chunks of the predefined size; and
for each respective data chunk among the at least two data chunks, count how many times the respective data chunk is present in the plurality of data chunks to determine the respective reference count for the respective data chunk.

4. The system of claim 1, wherein the memory device further includes instructions that are executable by the processing device for causing the processing device to determine the threshold value based on a system constraint.

5. The system of claim 4, wherein the system constraint includes a latency constraint, a memory constraint, or a processing constraint.

6. The system of claim 1, wherein the memory device further includes instructions that are executable by the processing device for causing the processing device to determine the threshold value based a size of a data chunk.

7. A method comprising:
for each respective data chunk of at least two data chunks in a container image:
determining, by a processing device, a respective reference count for the respective data chunk;
hashing, by the processing device, the respective data chunk to generate a hashed key;
determining, by the processing device, a logical address for the respective data chunk on a physical storage medium of a content addressable storage (CAS) system; and
storing, by the processing device, the hashed key, the respective reference count, and the logical address for the respective data chunk in a data table of the CAS system;
receiving, by the processing device, a request for the container image from a client device; and
in response to receiving the request from the client device:
determining, by the processing device, that the container image includes the at least two data chunks;
determining, by the processing device, a reference count for a data chunk among the at least two data chunks by accessing the data table, the reference count indicating how many times the data chunk is present in a plurality of container images;

determining, by the processing device, that the reference count for the data chunk is below a threshold value; and in response to determining that the reference count for the data chunk is below the threshold value, preventing, by the processing device, the client device from being queried about the data chunk prior to transmitting the data chunk to the client device.

8. The method of claim 7, further comprising:

determining another reference count for another data chunk among the at least two data chunks by accessing the data table;

determining that the other reference count for the other data chunk exceeds the threshold value; and in response to determining that the other reference count for the other data chunk exceeds the threshold value:
  transmitting a query communication to the client device;
  receiving a response to the query communication from the client device; and
  transmitting the other data chunk to the client device based on the response indicating that the other data chunk does not already exist on the client device.

9. The method of claim 7, further comprising:

determining another reference count for another data chunk among the at least two data chunks;

determining that the other reference count for the other data chunk exceeds the threshold value; and in response to determining that the other reference count for the other data chunk exceeds the threshold value:
  transmitting a query communication to the client device;
  receiving a response to the query communication from the client device; and
  preventing the other data chunk from being transmitted to the client device based on the response indicating that the other data chunk already exists on the client device.

10. The method of claim 7, wherein the at least two data chunks each have a predefined size, and further comprising:
  segmenting the plurality of container images into a plurality of data chunks of the predefined size; and
  for each respective data chunk among the at least two data chunks, counting how many times the respective data chunk is present in the plurality of data chunks to determine the respective reference count for the respective data chunk.

11. The method of claim 7, further comprising determining the threshold value based on (i) a size of a data chunk, and (ii) a system constraint.

12. The method of claim 11, wherein the system constraint includes a latency constraint, a memory constraint, or a processing constraint.

13. A non-transitory computer-readable medium comprising program code that is executable by a processing device for causing the processing device to:

for each respective data chunk of at least two data chunks in a container image:
  determine a respective reference count for the respective data chunk;
  hash the respective data chunk to generate a hashed key;
  determine a logical address for the respective data chunk on a physical storage medium of a content addressable storage (CAS) system; and
  store the hashed key, the respective reference count, and the logical address for the respective data chunk in a data table of the CAS system;

receive a request for the container image from a client device;

segment the container image into the at least two data chunks;

determine a reference count for a data chunk among the at least two data chunks by accessing the data table, the reference count indicating how many times the data chunk is present in a plurality of container images;

determine that the reference count for the data chunk is below a threshold value; and in response to determining that the reference count for the data chunk is below the threshold value, prevent the client device from being queried about the data chunk prior to transmitting the data chunk to the client device.

14. The non-transitory computer-readable medium of claim 13, further comprising program code that is executable by the processing device for causing the processing device to:

determine another reference count for another data chunk among the at least two data chunks;

determine that the other reference count for the other data chunk exceeds the threshold value;

in response to determining that the other reference count for the other data chunk exceeds the threshold value:
  transmit a query communication to the client device;
  receive a response to the query communication from the client device; and
  transmit the other data chunk to the client device based on the response indicating that the other data chunk does not already exist on the client device.

15. The non-transitory computer-readable medium of claim 13, further comprising program code that is executable by the processing device for causing the processing device to:

determine another reference count for another data chunk among the at least two data chunks;

determine that the other reference count for the other data chunk exceeds the threshold value;

in response to determining that the other reference count for the other data chunk exceeds the threshold value:
  transmit a query communication to the client device;
  receive a response to the query communication from the client device; and
  prevent the other data chunk from being transmitted to the client device based on the response indicating that the other data chunk already exists on the client device.

16. The non-transitory computer-readable medium of claim 13, wherein the at least two data chunks each have a predefined size, and further comprising program code that is executable by the processing device for causing the processing device to:

segment the plurality of container images into a plurality of data chunks of the predefined size; and for each respective data chunk among the at least two data chunks, count how many times the respective data chunk is present in the plurality of data chunks to determine the respective reference count for the respective data chunk.

17. The non-transitory computer-readable medium of claim 13, further comprising program code that is executable by the processing device for causing the processing device to determine the threshold value based on (i) a size of a data chunk, and (ii) a system constraint.

* * * * *